United States Patent
Bottlinger et al.

(10) Patent No.: US 12,409,956 B2
(45) Date of Patent: Sep. 9, 2025

(54) LATTICED STRUCTURE FOR VIBRATION CONTROL IN DYNAMIC ENVIRONMENTS

(71) Applicant: Northrop Grumman Systems Corporation, Falls Church, VA (US)

(72) Inventors: Esteen Bottlinger, Chandler, AZ (US); Nicholas R. Chandler, Queen Creek, AZ (US); Patrick Grosserode, Littleton, CO (US); Paul Hoffecker, Chandler, AZ (US); Richard Meitz, Phoenix, AZ (US); Scott R. Rowland, Gilbert, AZ (US); Trevor J. Pirtle, Laveen, AZ (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 441 days.

(21) Appl. No.: 18/091,444

(22) Filed: Dec. 30, 2022

(65) Prior Publication Data
US 2023/0211901 A1    Jul. 6, 2023

Related U.S. Application Data

(60) Provisional application No. 63/296,035, filed on Jan. 3, 2022.

(51) Int. Cl.
*B64G 1/64* (2006.01)
*C08K 3/04* (2006.01)
*B64G 1/22* (2006.01)

(52) U.S. Cl.
CPC ............ *B64G 1/6425* (2023.08); *C08K 3/041* (2017.05); *B64G 1/228* (2023.08); *C08K 2201/011* (2013.01)

(58) Field of Classification Search
CPC ............ B64G 1/641–648; B64G 1/228; C08K 3/041; C08K 2201/011
See application file for complete search history.

(56) References Cited

U.S. PATENT DOCUMENTS

| | | |
|---|---|---|
| 6,345,788 B1 | 2/2002 | Shtarkman |
| 2003/0006341 A1 | 1/2003 | Buder |

(Continued)

FOREIGN PATENT DOCUMENTS

| | | |
|---|---|---|
| CN | 111532452 | 8/2020 |
| WO | WO2024072442 | 4/2024 |

OTHER PUBLICATIONS

Chi et al., "Design of active whole-spacecraft vibration isolation based on voice-coil motor", Sensors and Smart Structures Technologies for Civil, Mechanical, and Aerospace Systems, vol. 9061, pp. 90613X1-90613X-7, 2014.

(Continued)

*Primary Examiner* — David R Morris
(74) *Attorney, Agent, or Firm* — Christensen, Fonder, Dardi & Herbert PLLC

(57) ABSTRACT

Embodiments of the disclosure are directed to a vibration control system and a vibration control device for structurally isolating a load from a vibration source. In various embodiments a vibration isolation device includes a first and support structure and a sidewall extending between and defining a body of the vibration isolation component. In embodiments the sidewall is configured to structurally support the load. In embodiments the sidewall includes one or more lattice portions occupying at least part of a total area of the sidewall, the lattice portions configured to attenuate a transfer of vibrations through the sidewall between the first and second support structures for reducing vibration transfer from the spacecraft vibration source and the load. In embodiments the body of the vibration isolation device is approximately the same as a component without one or more lattice portions such that the payload interface cone is a drop-in replacement.

20 Claims, 13 Drawing Sheets

(56) References Cited

U.S. PATENT DOCUMENTS

2016/0061282 A1* 3/2016 Thuswaldner ........... B64G 1/22
                                                          267/141
2019/0016483 A1  1/2019 Ewing et al.
2021/0032100 A1  2/2021 Inoue et al.

OTHER PUBLICATIONS

Jun et al., "An Evaluation of the Whole-Spacecraft Passive Vibration Isolation System", Proc. Inst. Mech. Engineers Part G J. Aerospace Eng. 221, pp. 67-72. 2007.
Liu et al., "Octo-strut vibration isolation platform and its application to whole spacecraft vibration isolation", J. Sound Vibration 289, pp. 726-744, 2006.
Syam et al., "Design and Analysis of Strut-Based Lattice Structures for Vibration Isolation", Precision Engineering, 2017, pp. 494-506.
Tang et al., "Design and experimental study of a VCM-based whole-spacecraft vibration isolation system", J. Aerospace Eng., 2018, pp. 04018045-1-04018045-12.
Rittweger et al., "Feasibility demonstration of an active payload adapter for Ariane 5", In Spacecraft Structures, Materials and Mechanical Testing 2005, 581, pp. 1-11.
International Search Report and Written Opinion, for corresponding PCT/US2022/054310, mailed Mar. 28, 2024, 16 pages.

\* cited by examiner

LATTICED STRUCTURE FOR VIBRATION CONTROL IN DYNAMIC ENVIRONMENTS

CROSS REFERENCE TO RELATED APPLICATIONS

This application claims the benefit of U.S. Provisional Application No. 63/296,035, filed Jan. 3, 2022, the entire contents of which are incorporated by reference herein.

FIELD OF THE DISCLOSURE

Various embodiments of the disclosure are directed to vibration control. Specifically, various embodiments of the disclosure are directed to lattice structure for vibration control in whole spacecraft isolation systems.

BACKGROUND

Vibration control is an increasingly important characteristic for components used in fields such as automotive, aerospace, construction, and biomedical industries. Generally stated, vibration describes a cyclical reciprocating motion that exists widely in nature and occurs for various reasons such as from movement, shock, sound, and the like. When vibration exceeds a certain limit, it can cause harm to equipment, components, structures, and even the human body. As a result, these types of excess vibrations can cause many engineering problems, such as structural failures, failure of precision equipment, and the disruption of various electronic components.

The application of vibration mitigation methods, devices, and materials has been expanded into a variety of fields, such as civil engineering, mechanical engineering, and aerospace engineering. For example, in the field of aerospace engineering, multi-dimensional vibration control has become an important consideration to ensure the safety of satellite payloads or other equipment in the launch stage. Vibrations during launch are commonly generated by flight events such as engine ignition, booster separation, and acoustic excitation, and the frequency domains of each of these excitations can be different. As a result, vibration mitigation generally requires the ability to mitigate vibrations that occur along a wide range of frequencies.

Generally, vibration mitigation in spacecraft includes both whole-spacecraft vibration isolation and micro-vibration control. Whole-spacecraft vibration isolation refers to methods and devices for the reduction of the vibration loads during launch to reduce the risk of the spacecraft and its instruments being damaged before entering orbit. The launch stage is the most severe dynamic environment that a spacecraft will experience during its mission life. To survive this stage, the structure of a spacecraft is generally strengthened by adding mass/structure that will be useless once the spacecraft is in orbit. This not only increases launch costs, but also reduces the mass margin that could be used for launching additional payload. Micro-vibration control refers to the methods and devices for the reduction of risk of damage to instruments or components from vibration after launch while the spacecraft or satellite is in orbit. Both passive vibration control devices and active vibration control devices have been used however, active vibration control devices have generally demonstrated vibration control performance at greater cost and complexity.

Over the past few decades, effort has been made by researchers toward vibration mitigation methods, devices, and materials in spacecraft and other applications. For example:

Jun et al., *An evaluation of the whole-spacecraft passive vibration isolation system*, Proc. Inst. Mech. Engineers Part G J. Aerospace Eng. 221, 67-72 (2007) discloses an active vibration control device for whole-spacecraft vibration isolation which includes a plurality of isolator devices inserted between a launch vehicle and a payload adaptor. In addition, passive constrained layer damping (PCDL) material is attached to the outer surfaces of the payload adapter.

Tang et al., *Design and experimental study of a VCM-based whole-spacecraft vibration isolation system*, J. Aerospace Eng. (2018) discloses an active whole-spacecraft isolation system based on voice coil motors (VCMs). The Tang system includes VCMs, supporting leaf springs, and actuator supports that are placed between a launch vehicle and the payload adaptor. As such, the tang system can satisfy the design requirement of vibration isolation with the addition of the VCMs and associated components without changing the payload adaptor fitting structure itself.

Rittweger et al., *Feasibility demonstration of an active payload adapter for Ariane 5*, In Spacecraft Structures, Materials and Mechanical Testing 2005, 581 (2005) discloses an active payload adaptor for reduction of interface loads to the payload in the low frequency domain (<100 Hz). The Rittweger adaptor consists of two interface rings connected by 24 active struts. The dynamic load transfer to the launcher goes via a structural path through the payload adaptor, which makes the structural connection from launcher payload to the launcher.

Liu et al., *Octo-strut vibration isolation platform and its application to whole spacecraft vibration isolation*, J. Sound Vibration 289, 726-744 (2006), presents an octo strut passive vibration isolation platform for replacement of an existing payload attaching fitting to provide an interface between a launch vehicle and a spacecraft.

Liu, F., Fang, B., and Huang, W. H. (2010). "Vibration control of flexible satellites using a new isolator," In 2010 3rd International Symposium on Systems and Control in Aeronautics and Astronautics Harbin: IEEE, 593-597, (2010), presents a Circular Payload Adapter Fitting (CPAF) which integrates passive and active vibration control with piezoelectric stack actuators.

Chi et al., *Design of active whole-spacecraft vibration isolation based on voice-coil motor*, Sensors and Smart Structures Technologies for Civil, Mechanical, and Aerospace Systems, Vol. 9061. 90613X1-90613X-7, (2014), presents a voice-coil motor designed and optimized as an active control actuator to provide proper feedback force to reduce the amplitude of the vibration and is fixed in the whole-spacecraft vibration isolation platform, with sensors collocated on one side of the voice-coil motor in the vertical direction.

As seen in Rittweger, and Liu 2006, researchers have explored the use of strut-based structures to enhance the mechanical vibration isolation properties of a machine frame and reduce mass while also conserving structural integrity. However, in the case of the Rittweger device are, the vibration control device is designed as an active device that depends on hydraulic struts configured to adjust to control vibration. The use of active vibration control devices adds cost and complexity to the design along with increased chance for component failure from the vibration control components. In the case of Liu, the device applies the design concepts of a Stewart platform for whole-spacecraft passive vibration isolation. The Liu device adds redundancy to a traditional Stewart platform design by adding redundant struts to the platform for the purpose of safety and reliability.

Outside of the specific realm of spacecraft, researchers have additionally explored the use of additive manufacturing or 3D printing to create strut-based structures to enhance the mechanical vibration isolation properties of a machine frame. For example, Syam et al., *Design and Analysis of Strut-Based Lattice Structures for Vibration Isolation*, Precision Engineering (2017) presents an additive manufacturing lattice design used for a vibration isolation structure.

There is still a need to continually investigate and improve the properties of the vibration mitigation materials. As such, improvements to vibration mitigation and control devices would be well received.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
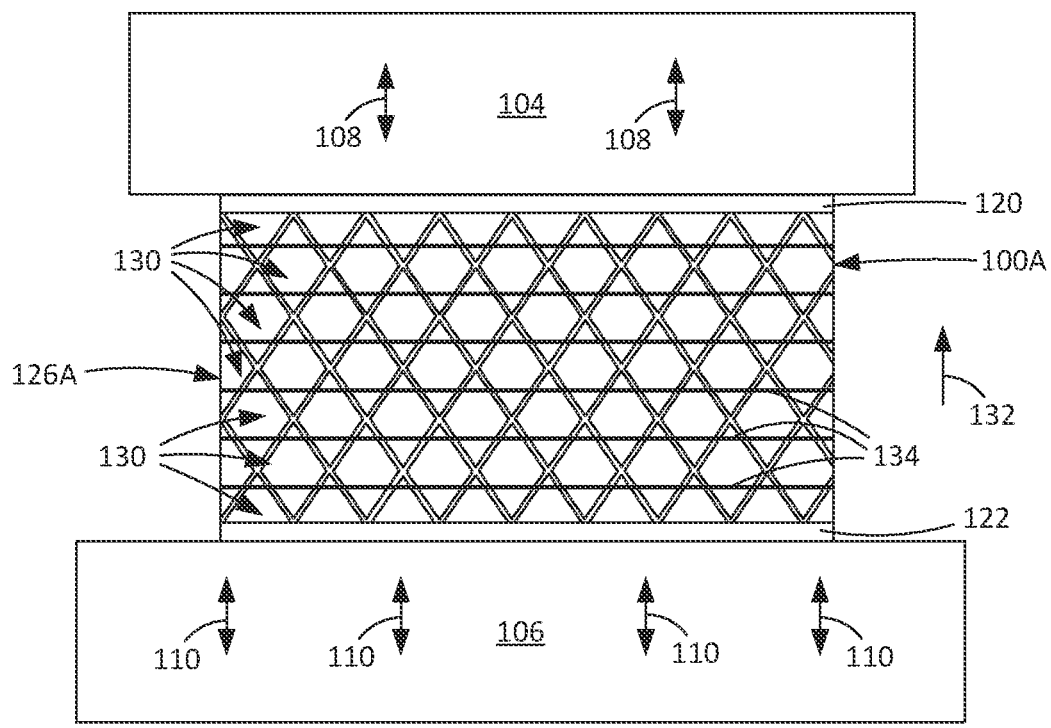
FIGS. 1A-1B depict vibration control devices, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

SUMMARY

One or more embodiments of the disclosure are directed to a tuned lattice attenuator and methods for tuning a lattice attenuator for customized dynamic mechanical loading.

In various fields such as automotive, aerospace, construction, and biomedical industries, dynamic environments such as shock, vibration, acoustics, and the like, can be a significant design constraint. For example, in aerospace applications among others, dynamic environments can present the most detrimental loading case for onboard electronics, avionics, ordnance, pneumatic components, and the like, and can impact the functionality or cause component damage. As a result, dynamic environments can in some instances result in total system failure via damage to one or more critical components.

Generally, there have been multiple approaches to address the problems posed by dynamic environments. These approaches have included designing hardware to be more tolerant of the dynamic environment or isolating the hardware from the dynamic environment using a mechanical interface. In many instances however, designing hardware to be tolerant of dynamic environments is not possible due to technical constraints, schedule or cost constraints, or the severity of the dynamic environment.

As such, isolation systems are more often used for vibration control. However, isolation systems possess their own disadvantages. For example, to protect a specific component multiple isolators may be required. Depending on the weight of the supported hardware the isolators themselves must be appropriately selected and sized based on the supported hardware's natural frequency. Furthermore, mounting hardware is also required to secure each isolator. This includes fasteners, washers, and standoffs where necessary. This increases part quantity, complexity and adds to system mass. As another example, once a component is isolated it is no longer secured to the substrate, meaning that it is more susceptible to adverse temperature change. To protect the component, a heat sink bracket or other thermal management system may be required. These add design and manufacturing costs.

Further, once a component is isolated it may lose its electrical ground path. This means that a metal grounding strap may be required for every component and especially for avionics electronics or other electronics. Still further, often times acceptance testing of isolators by themselves is required to demonstrate/verify lot performance. Isolators are then tagged as sets to be installed together which requires tracking and verification. Lastly, larger systems such as aircraft, amphibious vehicles, underwater vehicles, and launch vehicles may have dozens if not hundreds of components requiring isolation. This adds meaningful costs in labor, documentation, and tracking requirements that can add up at a system level, despite being small individually. Aside from cost, this creates a meaningful amount of system wide "parasitic mass"—mass which exists solely to reduce dynamic environments. Parasitic mass results in efficiency losses in less mass-sensitive applications but can become a matter of critical concern in more mass-sensitive applications such as spacecraft design. Finally, all of these activities can contribute to more prolonged manufacturing schedules.

In light of these issues, various embodiments of the disclosure provide a dynamic environment isolator/vibration control device that can address the problems inherent with existing isolation systems. In one or more embodiments the attenuator comprises a latticed support structure that can be used to mitigate dynamic environments in a system by isolating connected elements from a vibration source. Further, in various embodiments, due to the nature of latticed structures, embodiments can function as a drop-in replacement to an existing structure or component in a system that provides vibration attenuation/control while also preserving the same or a similar structural strength as the replaced structure/component. As such, various embodiments allow for "plug and play" use in existing/legacy systems without requiring a redesign or significant modification. For example, in various embodiments existing legacy components can simply be removed and replaced by embodiments of the disclosure that maintain similar shape, size, and structural characteristics to support loads but in contrast with the replaced component include inherent vibration attenuating/isolating characteristics as a result of a latticed structure/design. Because the latticed support structure provides inherent vibration control, various embodiments altogether can eliminate the need for isolation at individual or localized levels. Depending on the application, components may be connected to or hard mounted to a lattice support structure thereby eliminating need for isolators, standoffs, associated mounting hardware, brackets, grounding straps, or the like. For example, the avionics cylinder of the Minotaur IV S4 rocket required over 200 individual isolators—amounting to a large amount of system-wide parasitic mass.

In one or more embodiments the parasitic mass of these traditional vibration isolating devices is eliminated. As a result, various embodiments can provide improved performance capabilities and significantly reduce costs. For example, embodiments can improve payload capacity of launch vehicles by reducing parasitic mass. For instance, certain embodiments could result in increases to payload capacity by 13%. In addition, various embodiments can result in significant reductions to design costs via the simplification or elimination of vibration control analysis. Similarly, manufacturing schedules can be shortened and/or standardized due to the "plug and play" nature of various embodiments. For example, soft ride systems used to mitigate vehicle transient loads into spacecraft can cost upwards of $300K to $600K in development costs with 12-18 month added development time. In various embodiments these costs and the added development time can be substantially reduced or even eliminated. For example, various embodiments can result in launch vehicle cost reductions of approximately 16%.

As such, one or more embodiments are directed to a vibration control system for whole-spacecraft vibration isolation. In various embodiments the system comprises a payload interface cone for connection between a spacecraft vibration source and a load. In various embodiments the payload cone includes a first support structure, a second support structure, and a sidewall extending between the first and second support structures and defining a frustoconical body of the payload interface cone. The sidewall is configured to structurally support the load against the second support structure such that the load is isolated from the spacecraft vibration source. In one or more embodiments the sidewall includes one or more lattice portions occupying at least part of a total area of the sidewall. In various embodiments the lattice portions are configured to attenuate a transfer of vibrations through the sidewall between the first and second support structures for reducing vibration transfer from the spacecraft vibration source and the load. In various embodiments the frustoconical body of the payload interface cone is approximately the same as a component without one or more lattice portions such that the payload interface cone is a drop-in replacement component. In certain embodiments, the system does not include independent dampening devices such as springs or the like for vibration attenuation.

The above summary is not intended to describe each illustrated embodiment or every implementation of the present disclosure.

DETAILED DESCRIPTION

Figure 1B:
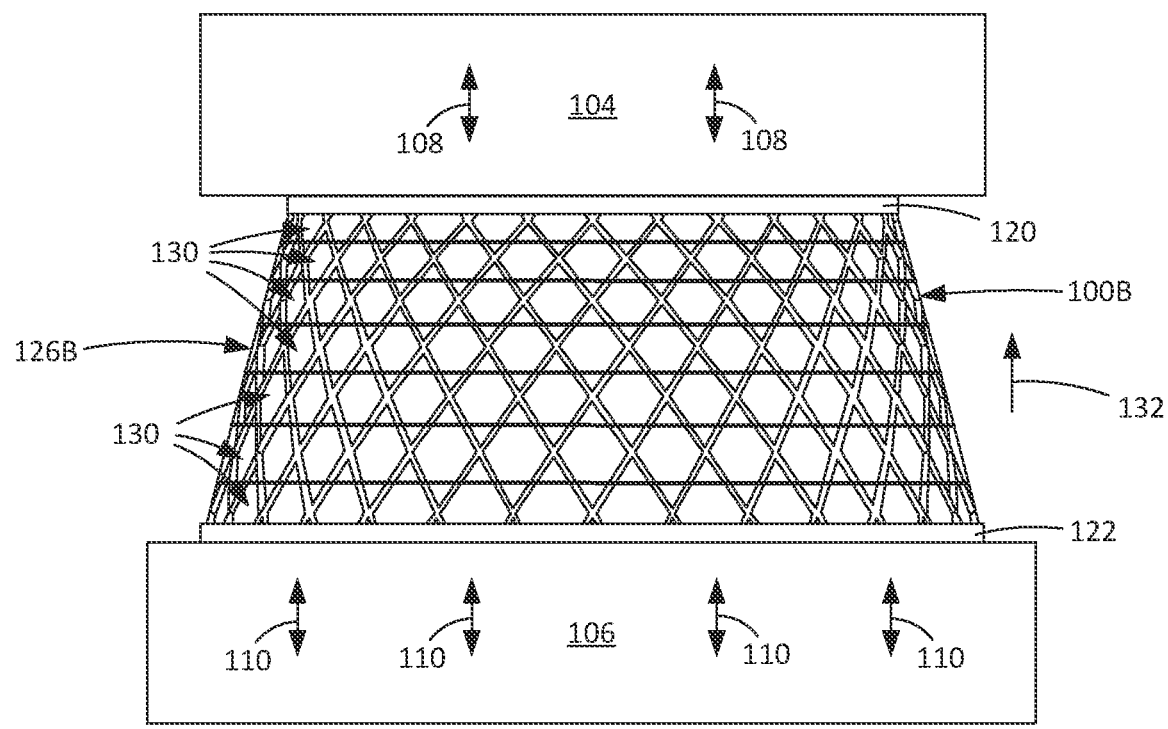

Referring to FIGS. 1A-1B, a vibration control device 100A, 100B is depicted, according to one or more embodiments of the disclosure. In various embodiments the vibration control device 100A, 100B is a structural component of a vibration isolation system that functions to physically support and/or isolates a load 104 from a vibration source 106 to protect the load 104 from potential vibration damage. In such embodiments, the vibration control device 100A, 100B is a sub-component or sub-system of a larger system where the supported load 104 is isolated or protected from dynamic environments. For example, in various embodiments the device 100A, 100B is part of a whole-spacecraft isolation system configured to isolate an attached payload that is included in a launching space vehicle. However, this is only an example use and in various embodiments the device 100A, 100B could be a component of any suitable type of vibration isolation system such as those used in automotive, medical devices, or other types of systems. In one or more embodiments the supported load 104 is connected to the vibration source 106 only through the device 100A, 100B. However, in certain embodiments the supported load 104 could be supported by a plurality of vibration control devices or other structural components. In some embodiments the vibration device could be directly connected or indirectly connected to the load 104 such that one or more other components may be positioned between the device and the load itself.

Figure 2A:
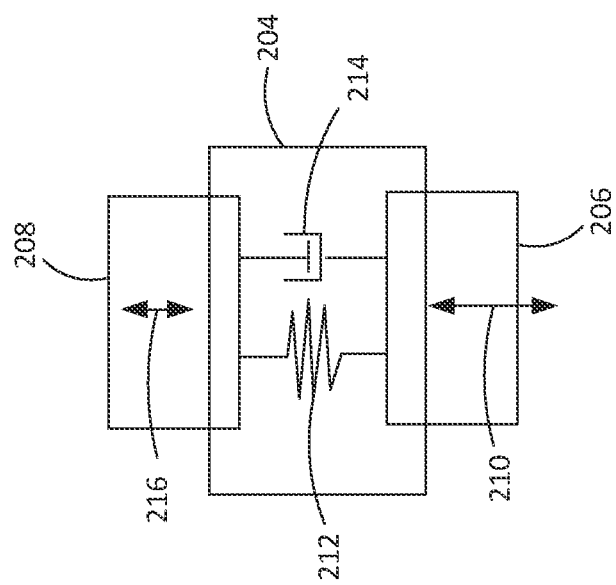
FIG. 2A-2B depicts a high-level view of a vibration control device and a graph illustrating the effect of vibration control, according to one or more embodiments of the disclosure.

In various embodiments, the vibration control device 100A, 100B includes one or more structural features that inhibit or attenuate the transmission of vibrations from the vibration source 106 to the supported load 104. As such, when connected to the device 100A, 100B the load 104 will generally possess a vibration amplitude 108 that is reduced relative to a vibration amplitude 110 at the vibration source 106. For example, referring additionally to FIGS. 2A-2B, a high-level view of a vibration control device 204 and a graph illustrating the effect of vibration control are depicted, according to one or more embodiments of the disclosure. Referring specifically to FIG. 2A, a simple example is depicted where vibration is transferred from an external vibration source 206 to a load 208, which in various embodiments can be a machine, structure or other system component that requires some amount of protection from dynamic environments.

In such embodiments load 208 is protected from a vibration source 206 via the vibration control device 204 that both supports the load 208 and reduces the effect of source vibration 210 on the supported load 208. For example, in various embodiments the device 204 is constructed from structure that having structural characteristics and/or material that function to isolate, dampen, or otherwise attenuates the transfer of source vibration 210 to the load 208. For example, depicted in FIG. 2A, the device 204 functions both as an isolator 212 and as a dampener 214. For example, in various embodiments the isolator 212 can be used to reduce the vibration amplitude 216 that is transferred to the machine, with respect to the external vibration, by separating the load 208 from the external vibration source 206. In one or more embodiments, the ratio of the reduced vibration 216 seen by the load 208 vs the source vibration 210, indicates the extent of the isolation from external vibration. In various embodiments dampener 214 has a damping coefficient that can be the result of a damping component/material or can be from the structure of the device 204 itself.

Figure 2B:
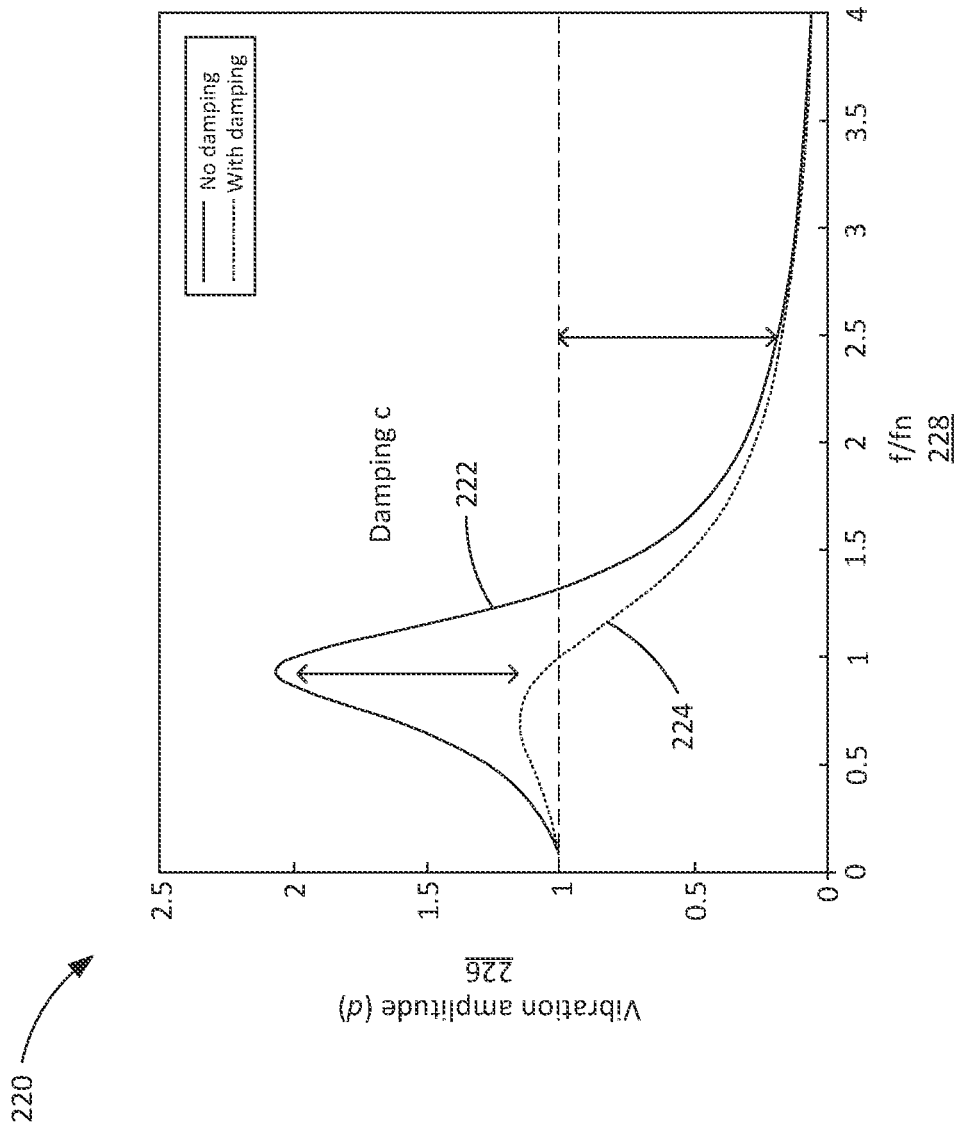

The result of vibration control is depicted in the graph 220 of FIG. 2B, which considers a two scenarios where vibration is transferred from the vibration source 206 to the load 208 through different embodiments of a vibration control device 204. For instance, graph 220 considers a first embodiment 222 where a vibration control device 204 is configured as an isolator but does not include damping characteristics and a second embodiment 224 where the vibration control device 204 is both configured as an isolator and includes damping.

In FIG. 2B, the y-axis indicates a ratio 226 of the vibration amplitude experienced by the load 208 versus the vibration amplitude experienced by the vibration source 206 while the x-axis indicates a ratio 228 between a frequency f of vibration experienced by the load 208 verses a natural frequency $f_n$ of the load 208. As such, in one or more embodiments, the load 208 is considered to become one structure with the external vibration source 206 when the fraction of the transferred displacement to the load is equal to 1 as in such instances the load 208 is experiencing the same vibration amplitude as the source. Further, in various embodiments when the ratio between f and the natural frequency $f_n$ is equal to 1, the vibration amplitude of the load 208 will be amplified due to the effects of natural resonance. As such, depicted in FIG. 2B, the first embodiment and second embodiment of the device 204 function as vibration isolators by reducing the vibration amplitude ratio 226 below 1 as the vibration ratio 228 moves further from the resonance frequency for the load. Further, FIG. 2B depicts that in the second embodiment 224, the vibration damping characteristics of the device 204 functions to reduce the maximum vibration amplitude ratio 226 near the resonance frequency as compared to the undamped embodiment 222.

Described further below, in various embodiments the device 204 additionally functions to move or shift the natural frequency $f_n$ of the attached load 208. In such embodiments, by shifting the natural frequency $f_n$ the maximum vibration amplitude 226 experienced by the load 208 can be shifted to a desired frequency—for example a frequency where the load 208 is most capable of tolerating vibration forces. For example, the attached load 208 may have a higher tolerance for vibrations located at a particular wavelength such that by shifting the natural frequency to that wavelength the load can be protected via the greatest vibration amplitude occurring where the load is most suited to withstand vibration.

Depicted in FIGS. 1A and 1B the device 100A, 100B is configured as a latticed vibration control device. It has been observed by the inventors that lattice structures allow for a high-efficiency vibration isolation structure that additionally present sufficient structural integrity to sustain a load. As such, in various embodiments utilize a latticed sidewall design to replace portions of existing components or to create new components that possess the same size/shape as previous components and the same or similar structural integrity but with vibration control characteristics integrated into the component itself. As such, various embodiments can function as a drop-in replacement to an existing structure or component in a system that provides vibration attenuation/control while also preserving the same or a similar structural strength as the replaced structure/component.

In one or more embodiments the device 100A, 100B includes a frame structure including a first support structure 120 and a second support structure 122 that are attached respectively to the vibration source 106 and the supported load 104. In various embodiments the first and second support structures 120, 122 are generally solid portions of the device that are configured to attach to the load 104 and/or vibration source 106. As such, in various embodiments the support structures can also be referred to as a top portion or bottom portion of the device, or support platform, or the like. In various embodiments the device 100A, 100B includes a latticed sidewall 126A, 126B that makes up the body of the device and connects the first and second support structures 120, 122. In such embodiments the sidewall 126A, 126B is configured to support a structural load applied to the first and second support structures 120, 122—such as supporting the load on a vibration source.

In various embodiments the latticed sidewall 126A, 126B includes one or more latticed portions 130 that occupy at least a portion of a total area of the sidewall 126A, 126B. In various embodiments the latticed portions 130 are configured to attenuate the transfer 132 of vibrations between the first support structure 120 and the second support structure 122 by inhibiting the transmission of vibrations 132 through the connecting sidewall 126A, 126B. As such, in one or more embodiments the lattice design will improve and/or alter the isolation/damping characteristics of the device. For example, in certain embodiments the isolator can shift the natural frequency of the attached load and control device to attenuate vibrations in a specific way such that attached loads can be kept within acceptable vibration thresholds.

Specifically, depicted in FIG. 1A, the device includes a sidewall 126A with a generally cylindrical shape, for example, where the device is configured as cylindrical support, while depicted in FIG. 1B, the sidewall 126B has a frusto-conical shape, for example where the device is configured as a payload cone or as a bulkhead.

Depicted in FIGS. 1A-1B, the sidewall 126A, 126B includes a plurality of latticed portions 130 that are defined as sections of latticed sidewall between one or more latitudinally extending hoops 134. In various embodiments, the hoops 134 extend about the circumference of the sidewall and provide additional structural integrity for the device. Further, described further below, in various embodiments the hoops 134 allow for the use of different lattice designs or placements of latticed portions within the sidewall by segregating or separating different portions of the sidewall from one another. Depicted in FIGS. 1A-1B, the plurality of latticed portions includes seven latticed portions 130 that occupy 90% or greater of the total area of the sidewall 126A, 126B. However, in various embodiments, the sidewall 126A, 126B could include a fewer number or greater number of latticed portions and could occupy a larger or smaller percentage of the total area of the sidewall 126A, 126B. For example, in various embodiments the sidewall 126A, 126B could include a single lattice portion that occupies nearly 100% of the total area of the sidewall. In certain embodiments the plurality of latticed portions includes two or more lattice portions where the two or more lattice portions each occupy 10% to 50% of the total area of the sidewall. In certain embodiments, the sidewall 126A, 126B could include several smaller individual lattice portions that together make up only approximately 33% of the total area of the sidewall 126A, 126B. In various embodiments the vibration control device could have two or more latticed portions that are adjacent in the sidewall or non-adjacent. For example, in certain embodiments a latticed portion could be separated from another lattice portion by a solid portion/non-latticed portion of the sidewall. In various embodiments the total area occupied by the latticed portions is 5% to 100% of the total area of the sidewall. Described further below, in various embodiments the lattice portions can be constructed using a variety of different lattice designs to adjust/control the natural frequency based on the vibration control/structural integrity requirements of the device. In such embodiments, the plurality of lattice patterns could share the same pattern or have different patterns.

For example, referring to FIGS. 3A-3F, various embodiments of cylindrical vibration control devices are depicted, according to one or more embodiments of the disclosure.

The devices 300A-300F include a top support structure 304, a bottom support structure 308, and a cylindrical latticed sidewall 310A-310F connecting the top and bottom support structures 304, 308 and defining a cylindrical structure that is configured to support/displace a structural load between a vibration source and a supporting load. As such, in various embodiments the top and bottom support structures 304, 308 can be positioned between a load and a vibration source with the latticed sidewall providing structural support to maintain the separation while also providing vibration attenuation to reduce transmission of vibration through the device as described above. However, FIGS. 3A-3F depict vibration control devices 300A-300F having various different configurations of lattice designs for a vibration control device sidewall. In various embodiments, the lattice design will alter the isolation/damping characteristics of the device. For example, in certain embodiments the specific lattice designs can shift the natural frequency of the attached load and control device to attenuate vibrations in a specific way such that attached loads can be kept within acceptable vibration thresholds throughout use. FIGS. 3A-3F depict various configurations for lattice sidewalls, with each sidewall presenting a different vibration control profile relative to one another. In various embodiments, the appropriate lattice sidewall configuration can be selected or used based on the vibration control requirements of the load.

For example, referring to the table below the various embodiments of FIGS. 3A-3F present different natural frequencies relative to one another. Described further below, the configuration of FIG. 3A can referred to as a baseline configuration with FIGS. 3B-3F being variations of the baseline configuration of FIG. 3A. In that vein the table below includes a rock ratio and bounce ratio showing the differences between each embodiment in their natural resonance frequency as compared to the FIG. 3A baseline.

Figure 3A:
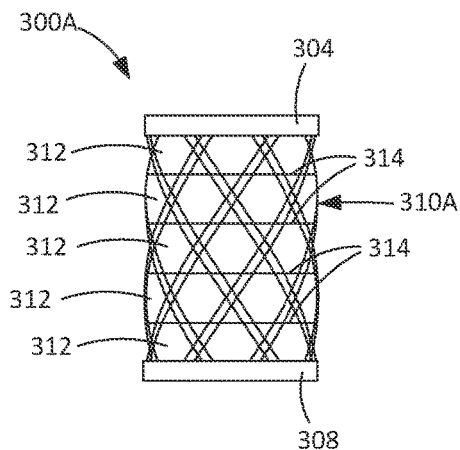
FIGS. 3A-3F depicts various embodiments of cylindrical vibration control devices, according to one or more embodiments of the disclosure.
Figure 3B:
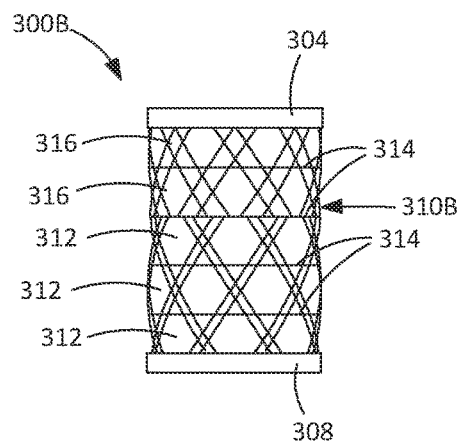
Figure 3C:
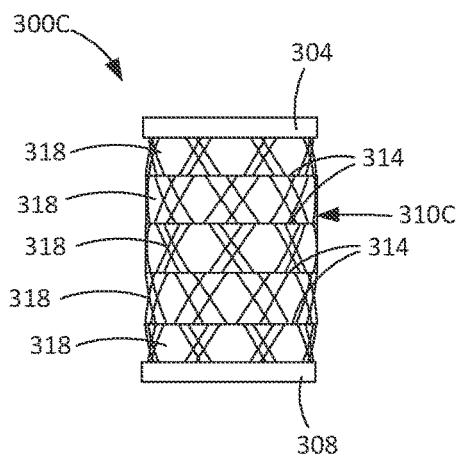
Figure 3D:
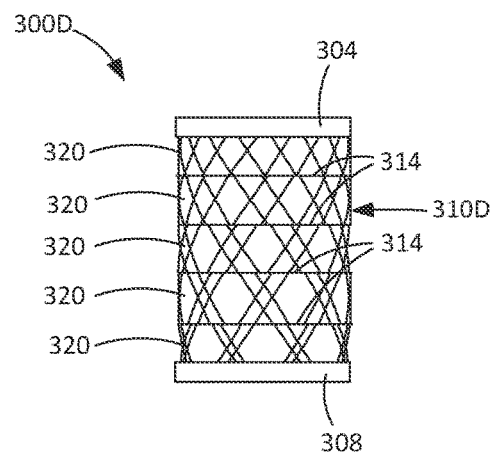
Figure 3E:
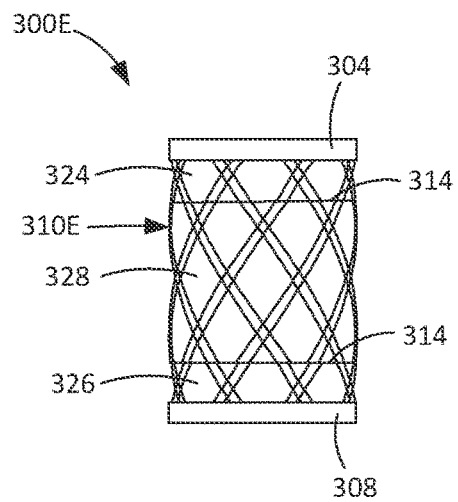
Figure 3F:
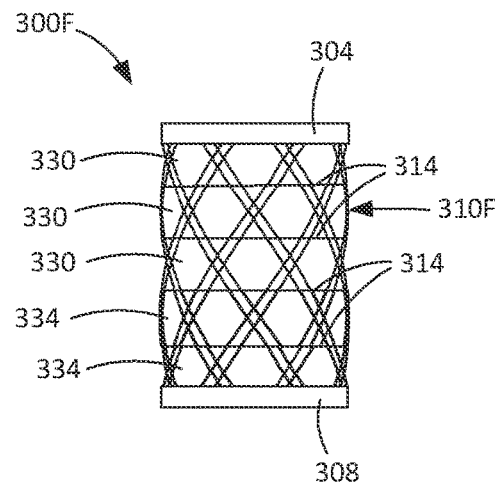

| Embodiment | Rock Frequency (Hz) | Bounce Frequency (Hz) | Rock Ratio | Bounce Ratio |
| --- | --- | --- | --- | --- |
| FIG. 3A | 75 | 254 | 1.00 | 1.00 |
| FIG. 3B | 69 | 238 | 0.92 | .094 |
| FIG. 3C | 54 | 205 | 0.72 | 0.81 |
| FIG. 3D | 72 | 244 | 0.96 | 0.96 |
| FIG. 3E | 46 | 124 | 0.61 | 0.49 |
| FIG. 3F | 89 | 355 | 1.04 | 0.96 |

In such a manner, existing payload support systems for spacecraft launch vehicles can be easily and quickly modified to include the appropriate vibration damping characteristics by replacing one or more standard components with an embodiment of the present disclosure that have been configured with latticed sidewalls for vibration damping functionality. For example, in various embodiments the devices of FIGS. 3A-3F could be substituted for existing structural components in a rocket to adapt the rocket for vibration damping to protect a supported load. In such a manner various embodiments can allow for the reduction of or even the elimination of separate vibration control devices in a spacecraft, thereby reducing mass and improving payload efficiency.

Referring specifically to FIG. 3A, the lattice sidewall 310A includes a plurality of latticed portions 312 that are defined by a plurality of longitudinally extending hoops 314 which segregate/distinguish each of the lattice portions 312 as described above. In FIG. 3A, the lattice design of each of the lattice portions 312 are aligned with one another such that the sidewall forms a continuous helical pattern that extends between the top and bottom support portions 304, 308. Depicted in FIG. 3A, while the lattice portions 312 are configured with a lattice pattern that possesses a helical design, however, in various embodiments the exact type and design of the pattern can differ. In one or more embodiments the configuration of FIG. 3A could be referred to as a baseline configuration with FIGS. 3B-3F being variations of the baseline configuration of FIG. 3A.

For example, FIG. 3B depicts a variation of the baseline design of FIG. 3A where the lattice sidewall 310B, includes two lattice portions 316 that are rotated about a central axis relative to the other lattice portions 312. As such, the plurality of latticed portions includes a first and second lattice portion 316 having a first lattice pattern and a second lattice portion 312 having a second lattice pattern. Specifically, in FIG. 3B the top two lattice portions 316 are rotated such that the helical lattice of the top two portions 316 are radially offset from lattice portion 312 and the top portions 316 and bottom portions 312 meet at a midspan between the vertically extending FIG. 3C, depicts a variation of the baseline design of FIG. 3A where the lattice sidewall 310C includes lattice portions 318 that are each rotated about a central axis relative to adjacent lattice portions 318 such that each lattice portion 318 includes helical lattice that hits midspans of adjacent lattice portions. FIG. 3D depicts a variation of the baseline design of FIG. 3A where the lattice sidewall 310D includes lattice portions 320 each rotated every row by a small angle relative to adjacent lattice portions 320. Specifically, the lattice portions 320 are rotated such that the helical design of the portions 320 are rotated by a small angle but not an angle sufficient such that the lattice portions hit midspans of adjacent lattice portions 320.

FIG. 3E depicts a variation of the baseline design of FIG. 3A where the lattice sidewall 310E includes only three lattice portions 324, 326, 328. In various embodiments hoops 314 can be added or removed as needed to adjust the number of defined lattice portions. As such, with the removal of two central hoops the sidewall 310E now only includes three lattice portions for example including a first and second lattice portion 324, 326 each occupying approximately 20% of the total area of the sidewall 310E and a third lattice portion 328 occupying approximately 60% of the total area of the sidewall. FIG. 3F depicts a variation of the baseline design of FIG. 3A where the lattice sidewall 310F includes two lattice portions 334 with lattice that has a different thickness in the lattice structure than a remainder of the lattice portions 330. Specifically, lattice portions 334 have a thicker lattice structure as compared to the lattice structure of lattice portions 330. As such, in various embodiments, the lattice design of the sidewall can include portions with variable thickness or different types of materials. For example, in certain embodiments some or all of the lattice portions could be constructed from different types of materials and/or have different thicknesses.

Figure 4:
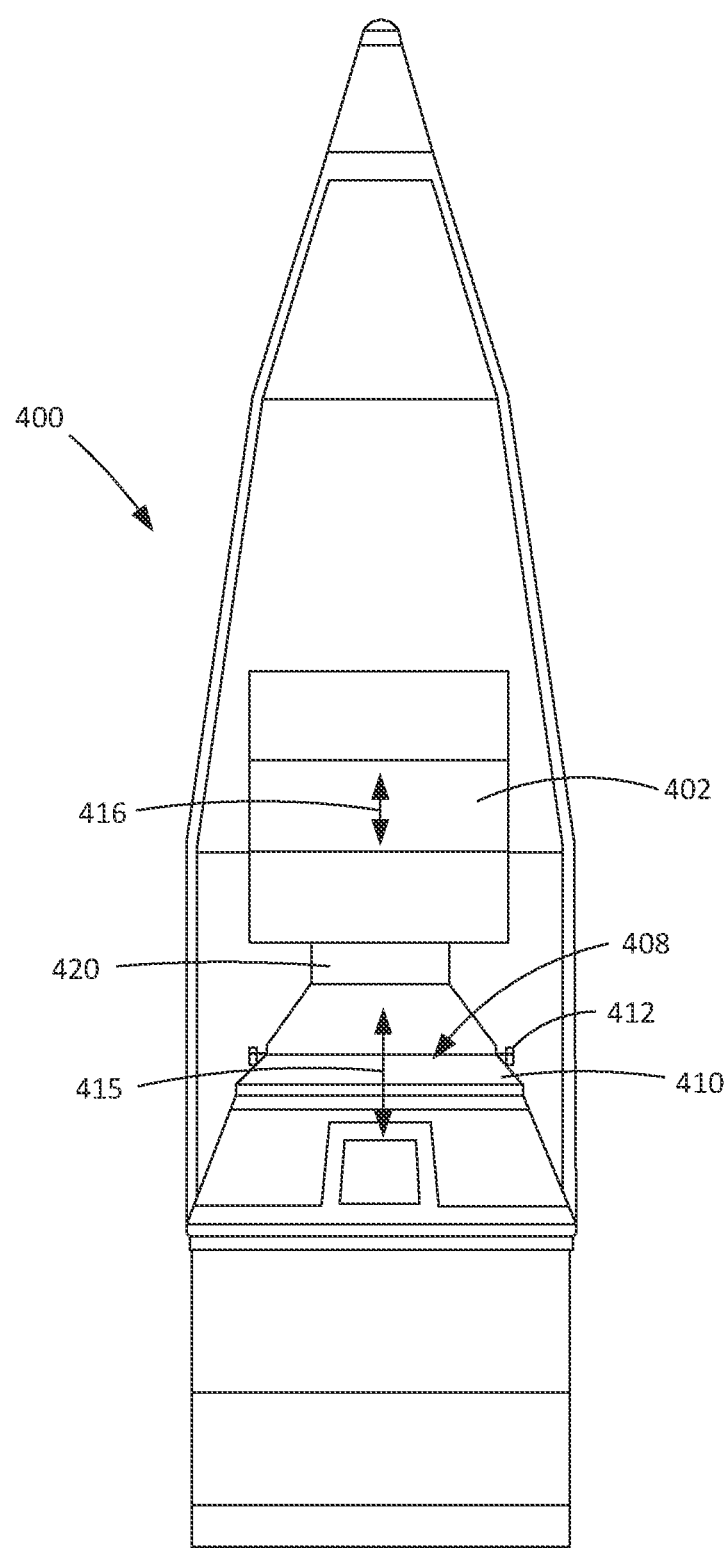
FIG. 4 depicts a spacecraft system of the prior art.

Referring to FIG. 4 a spacecraft system 400 of the prior art is depicted. In FIG. 4, the system 400 includes a load 402 and a payload interface system 408. In various embodiments the payload interface system 408 includes various components including a payload cone or interface cone 410 with one or more connected damping elements 412 that are configured to attach to and support the load 402 for launch. As described above, the payload interface system 408 is a whole-spacecraft vibration isolation system configured for reduction of vibration imparted to the load 402. As such, the payload system 408 is designed to reduce the risk of damage to the spacecraft 400 or its instruments before entering orbit.

To survive this stage, payload interface system 408 provides supporting structure such as the payload cone 410 and damping elements 408 to dampen and/or isolate the load 402 from source vibration 415. As such, the payload interface provides a structural element for supporting the load 402 while the damping elements 412 include various isolator components such as springs, damping material, or the like, to inhibit the transfer of vibration from the spacecraft to the load. As such, the damping elements 412 can be used to reduce the vibration amplitude 416 transferred to the load 402, with respect to the source vibration 415.

Depending on the weight of the load 402, the isolators themselves must be appropriately selected and sized based on the supported load's 402 natural frequency. Furthermore, mounting hardware is also required to secure each isolator. This includes fasteners, washers, and standoffs where necessary Further, a heat sink bracket or other thermal management system may be required along with various grounding straps.

Figure 5A:
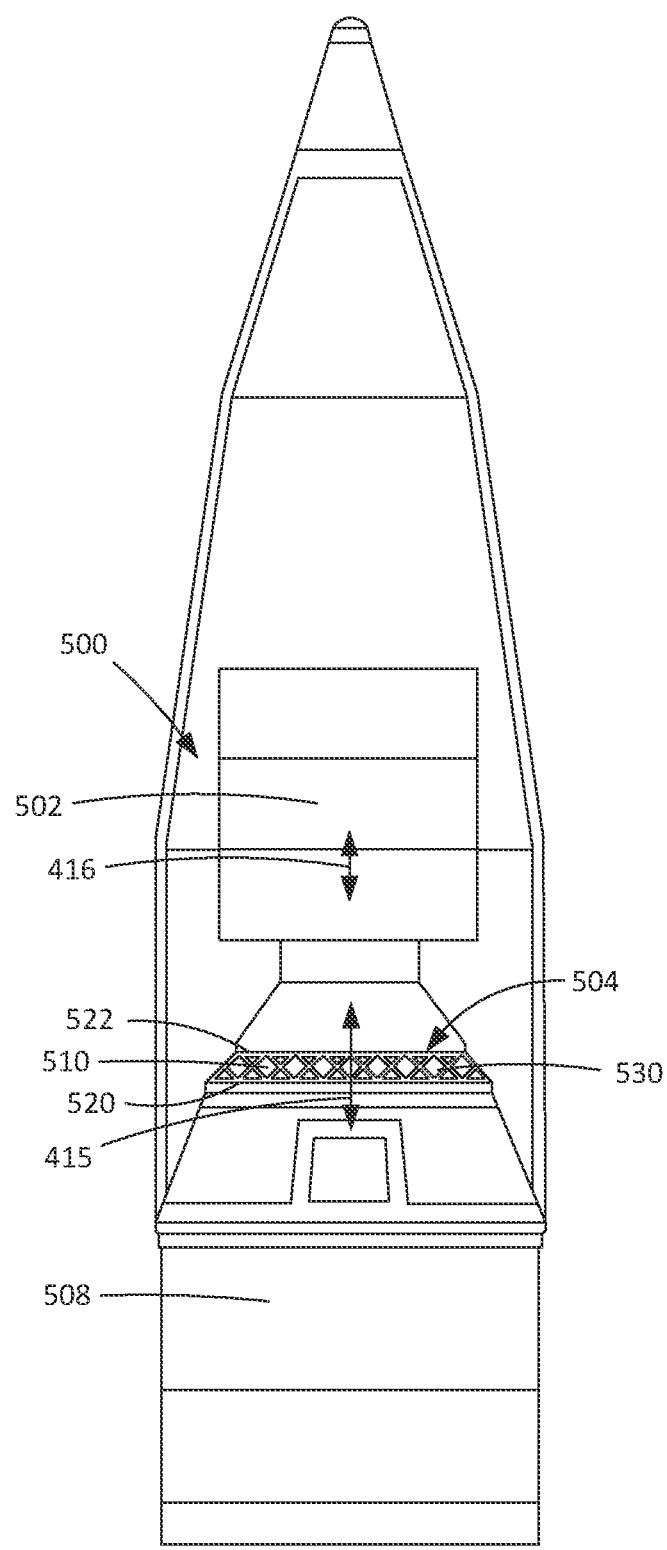
FIGS. 5A-5B depicts various embodiments of a whole spacecraft isolation system including one or more vibration control devices, according to one or more embodiments of the disclosure.
Figure 5B:
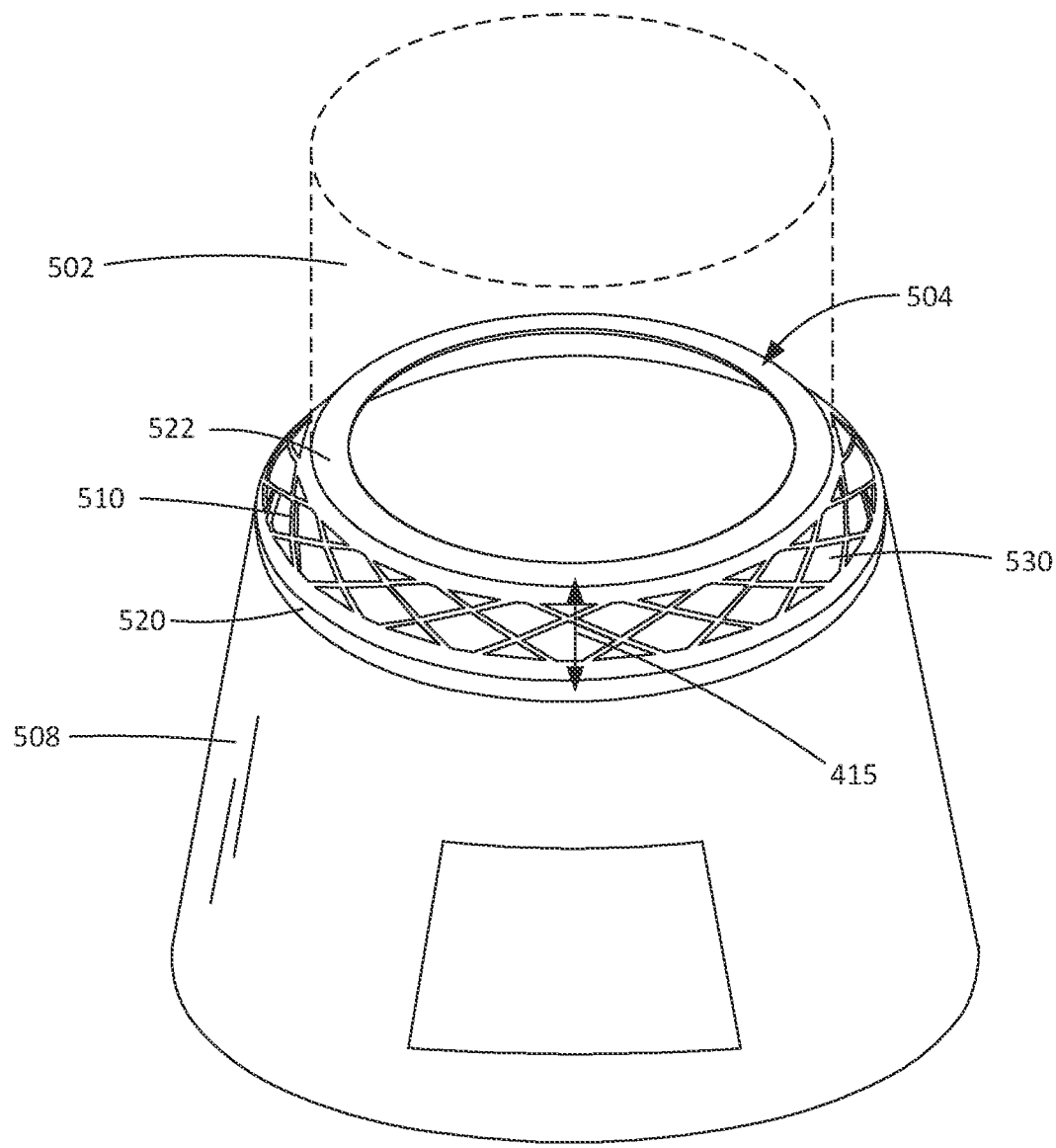

Referring to FIGS. 5A-5B, various embodiments of a whole spacecraft isolation system 500 including a vibration control device 504 are depicted, according to one or more embodiments of the disclosure. Specifically, FIG. 5A depicts a cross-sectional plan view of the vibration control device as part of a whole spacecraft isolation system 501 with an attached load 502 while FIG. 5B depicts a partial perspective view of the vibration control device 504.

In various embodiments vibration control device 504 is the same or substantially similar to vibration control device 100B described above with reference to FIG. 1B. For example, in one or more embodiments the vibration control device 504 includes a frame structure including a first support structure 520 and a second support structure 522 that are attached respectively to the vibration source 508 and the supported load 502. In various embodiments the first and second support structures 520, 522 are generally solid portions of the device that are configured to attach to the load 502 and a vibration source 508. As such, in various embodiments the support structures can also be referred to as a top portion or bottom portion of the device 504.

In various embodiments the device 504 includes a latticed sidewall 510 connecting the first and second support structures 520, 522. In such embodiments the sidewall 510 is configured to support a structural load against the first and second support structures 520, 522. In various embodiments latticed portions 530 of the sidewall 510 are configured to attenuate a transfer of vibrations between the first support structure 520 and the second support structure 522 by inhibiting the transmission of vibrations 415 through the sidewall 510. For example, in one or more embodiments the lattice design will alter the isolation/damping characteristics of the device 504 such that the device naturally possesses vibration attenuation characteristics without the use of independent dampening devices such as springs or the like such as shown in FIG. 4. In certain embodiments the device 504 can shift the natural frequency of the attached load 502 and control device to attenuate vibrations in a specific way such that attached loads can be kept within acceptable vibration thresholds.

Figure 6A:
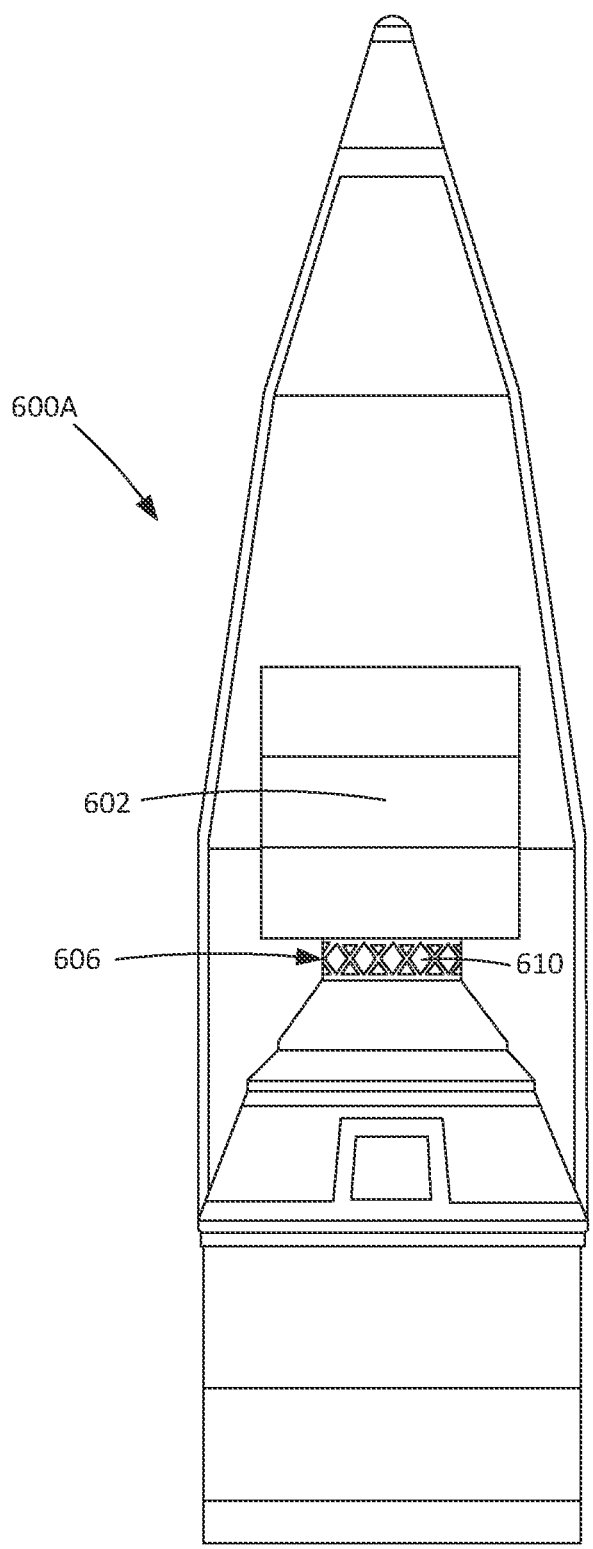
FIGS. 6A-6B depicts additional embodiments of a whole spacecraft isolation system 600B including one or more vibration control devices, according to embodiments of the disclosure.
Figure 6B:
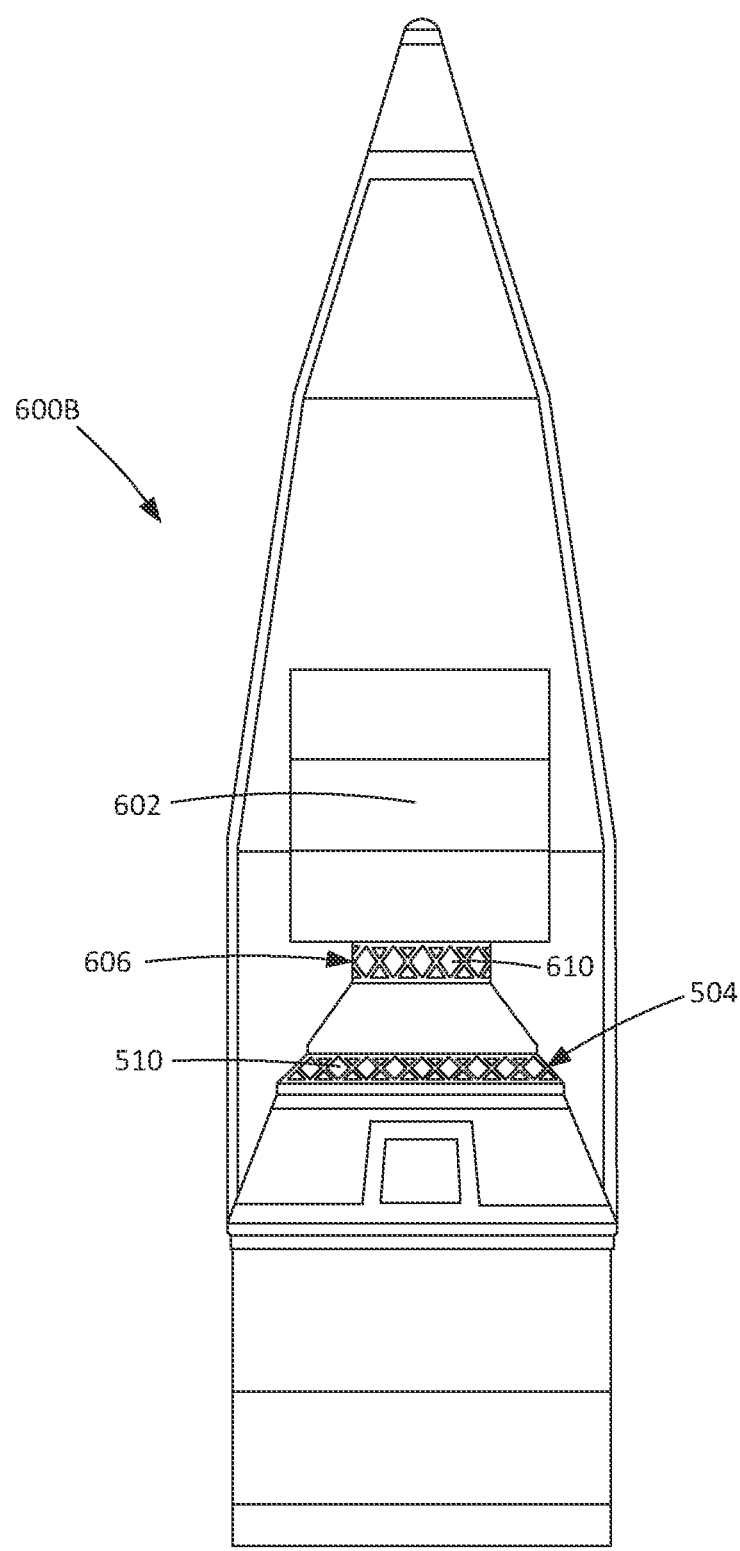

Referring to FIGS. 6A-6B, additional embodiments of a whole spacecraft isolation system 600A, 600B including one or more vibration control devices 504, 606 are depicted, according to embodiments of the disclosure. In various embodiments the vibration control device could be configured as various parts of the spacecraft isolation system in addition to or in lieu of the payload cone vibration control device 504 depicted in FIGS. 5A-5B. For example, Depicted in FIG. 6A, a cylindrical support 420 of FIG. 4, typically used purely for structural support of load 402 is converted into a vibration control device 606 that supports load 602. In various embodiments the vibration control device 606 is substantially similar to device 100A, described above with reference to FIG. 1A. As such, device 606 includes a latticed sidewall 610 with latticed portions configured to attenuate a transfer of vibrations by inhibiting the transmission of vibrations through the sidewall 610. For example, in one or more embodiments the lattice design will alter the isolation/damping characteristics of the device 606 such that the device naturally possesses vibration attenuation characteristics without the use of independent dampening devices such as springs or the like.

Referring to FIG. 6B, in various embodiments one or more additional components of the spacecraft can be replaced with structurally equivalent vibration control devices such that the spacecraft includes multiple vibration control devices 606, 504 where both of the devices function together to attenuate vibration transfer from the source to the attached load. In such embodiments, by additionally replacing existing components with vibration control devices the combination of isolators can further shift the natural frequency of the attached load and control device to attenuate vibrations in a specific way such that attached loads can be kept within acceptable vibration thresholds.

Figure 7A:
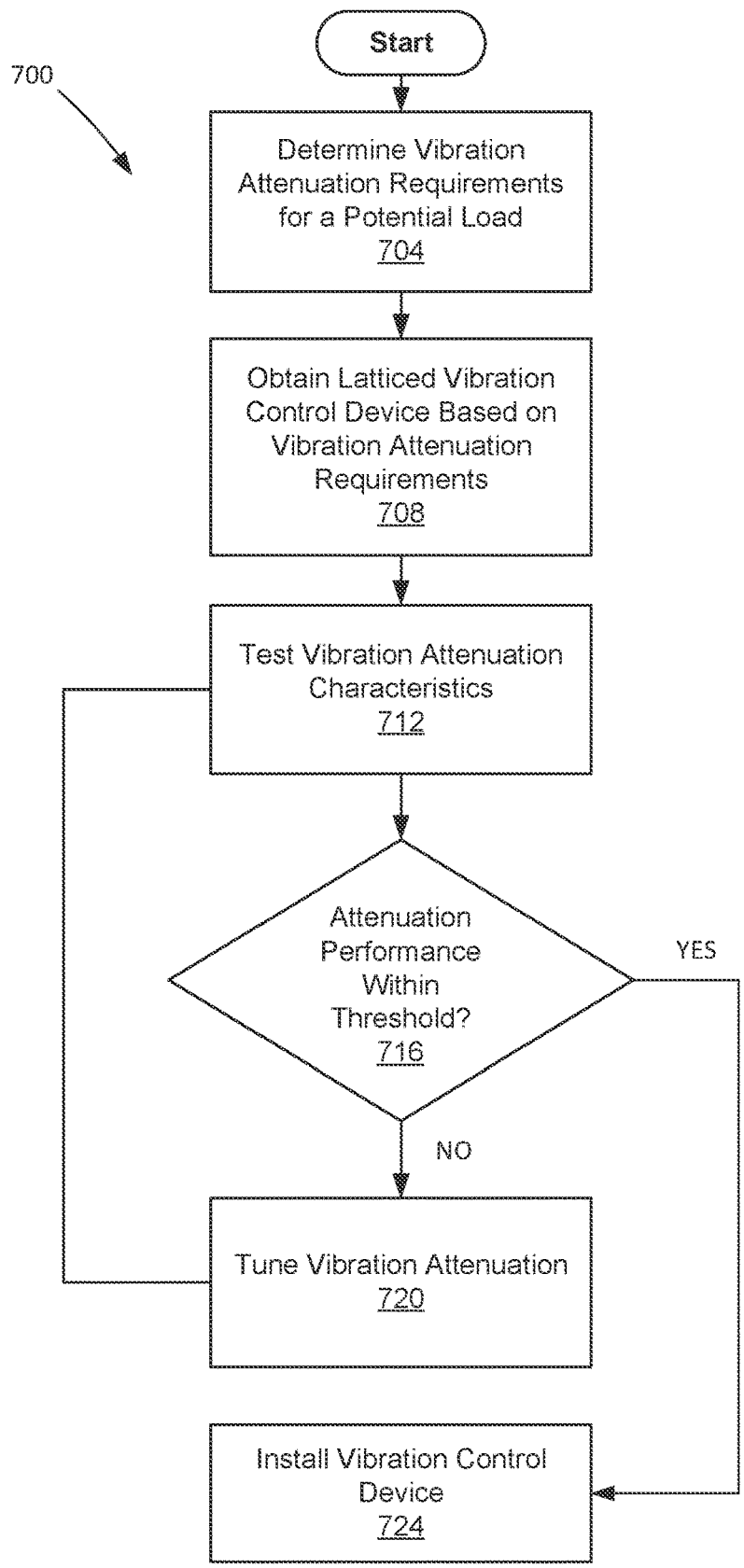
FIG. 7A depicts a method of installing a vibration control device is, according to one or more embodiments of the disclosure.

Referring to FIG. 7A a method 700 of installing a vibration control device is depicted, according to one or more embodiments of the disclosure. In one or more embodiments the method 700 includes, at operation 704, determining vibration attenuation requirements for potential load. For example, referring additionally to FIG. 7B, a graph 700 is depicted illustrating vibration amplitude 726 that may be experienced by the load across a range of frequencies 728. Specifically, graph 700 depicts a maximum vibration threshold 704, relative to the vibration amplitude 726 and the range of frequencies 728, that the load can experience without damaging the load. As seen in graph 700, the load and the vibration threshold 704 has a variety of different acceptable amplitudes 726 which depends on the vibration frequency. For example, seen in FIG. 7B, the load can experience a higher vibration amplitude at lower frequencies while, as the frequency increases, the threshold for acceptable amplitude quickly decreases.

Figure 7B:
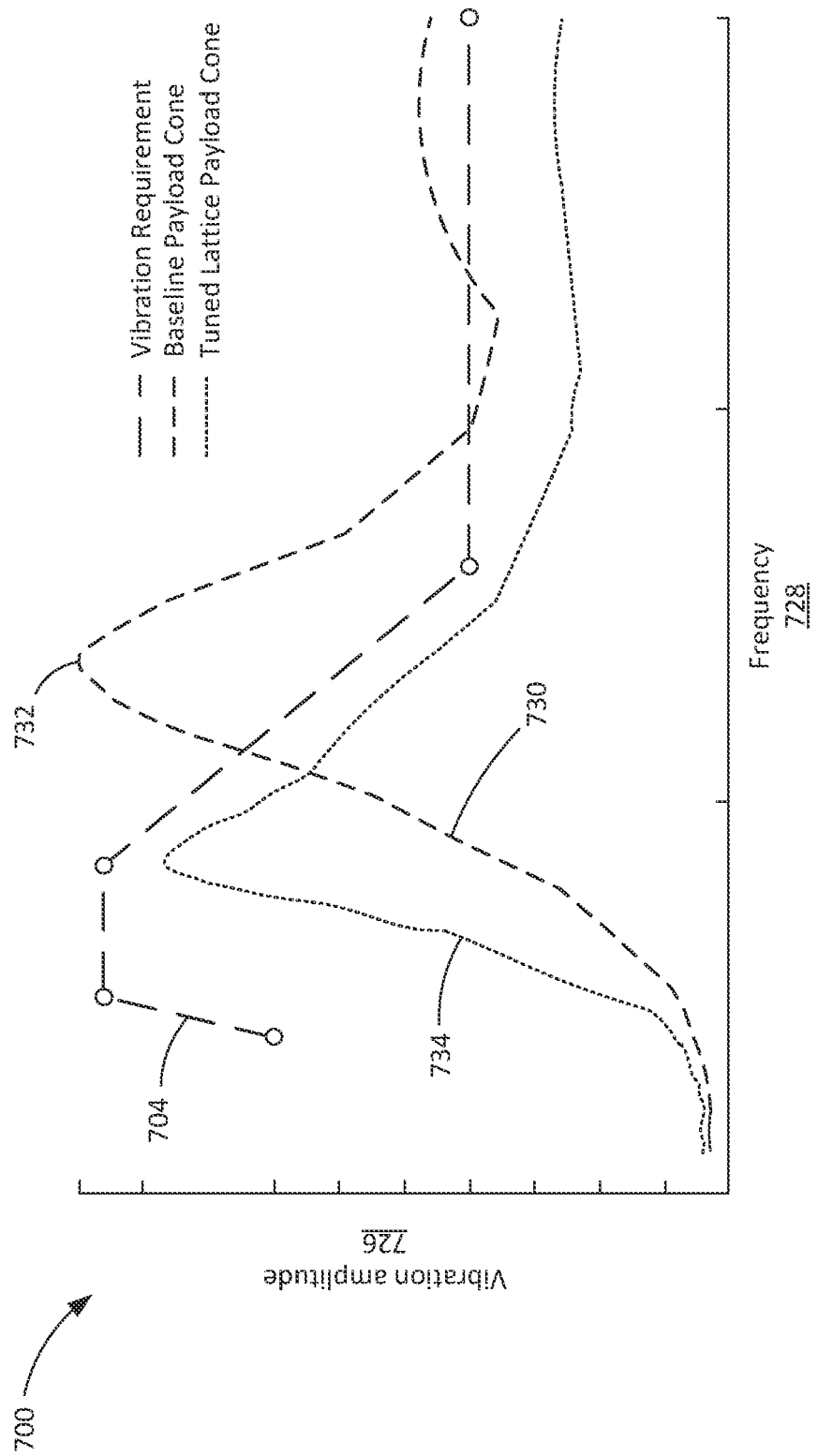
FIG. 7B depicts a graph illustrating vibration amplitude that may be experienced by a load across a range of frequencies.

In various embodiments the load will experience a baseline of amplitudes over the range of frequencies, depicted as a baseline line 730 and depicts the vibration amplitude that the load experienced when attached to a standard payload cone. As can be seen in FIG. 7B, the load possesses a peak amplitude at point 732 which exceeds the vibration threshold 704 due to the baseline natural frequency or resonance frequency of the load and attached payload cone components. As such, vibration attenuation efforts in various embodiments function to shift the natural resonance frequency for attached load and/or function to decrease the magnitude of the amplitude peak such that the vibration amplitude experience by the load is brought under the vibration threshold 704 across the whole range of frequencies 728. Specifically, in certain embodiments, the peak amplitude, occurring at the natural frequency or resonance frequency, if shifted to where the load has the greatest capacity for experiencing vibration. For example, in FIG. 7B the natural frequency could be shifted to occur at a lower frequency where the threshold 704 has the greatest amount of capacity for vibration amplitude.

In one or more embodiments the method 700 includes, at operation 708, obtaining a latticed vibration control device for the potential load based on the vibration attenuation requirements. The lattice vibration control device can be manufactured using a variety of manufacturing processes or methods. For example, in certain embodiments the device could be manufactured using a wet filament winding technique. In some embodiments, the device can be manufactured using printed tooling techniques such as Ultem printed tooling. In such embodiments, printed tooling manufacture and design is modular, often with interlocking sectors that can be swapped or combined for various new but similar designs. As such, in various embodiments printing tooling manufacturing allows for devices to be quickly manufactured/modified to produce a lattice design that satisfies the vibration attenuation requirements of a particular project by altering lattice design as needed. Further, in various embodiments the materials used for printing will have a relatively high coefficient of thermal expansion, which acts as a secondary force (other than vacuum) to aid in ply compaction. High growth tooling also helps to eliminate wrinkles.

In one or more embodiments the device could be manufactured using a hand layup processes. In such embodiments, although hand layup technique may be seen as tedious and labor, it allows for simplified and less robust tooling because it does not need to be designed with an adapter that interfaces to a winder and it also eliminates any stresses induced by the winder or the weight of the tool in the horizontal configuration. A hand layup allows for any localized feature to easily be designed into the tooling. This includes various lattice or asymmetric rib patterns. A hand layup can also support 0 Degree (axial) ribs and does not require an additional helical rib to jump between hoop bands during continuous strand winding In various embodiments, the device can be constructed from various materials such as steel, aluminum, polymer, composite material, or the like. In one or more embodiments the device can be constructed from a combination of materials. For example, in certain embodiments the lattice portions are constructed from first material such as a composite, while the support portions are constructed from a second material.

In various embodiments, the materials used can possesses intrinsic damping characteristics such that the use of the material provides additional damping to the device. In such embodiments the additional damping can reduce peak vibration amplitudes. For example, in one or more embodiments a carbon nanotube (CNT) composite material with damping characteristics is employed at least in the lattice portions. In such embodiments, CNT material can be employed in all primary and secondary structures to intrinsically impede dynamic environments. In various embodiments the CNT material can be constructed using a laminar bonding process to mold/form the latticed structure from a plurality of bonded sheets of CNT material.

In such embodiments the CNT material can include one or more: X55 acetone condensed; 112 Polymer w/X55 in TC-275; Nanocomp® CNT material processed using acetone to condense tubes into coherent sheet; X55/TC420 Sprayed; X55 sheets sprayed-coated with TC420 epoxy and cured; and N12 NanoStitch. In one or more embodiments, the interlaminar bonds may be reinforced by filling resin rich zones between tape layers. In such embodiments, reinforcing material can include chopped CNT material dispersed into resin at 2% ratio and filmed into pre-impregnated IM/7 cloth. In such embodiments the resin material can include TC275 resin by NanoComp®. In further embodiments the reinforcing material can include High Growth Rate (HGR)—Pure CNT non-woven and manufactured at high growth rate, and Low Growth Rate (LGR)—Pure CNT non-woven and manufactured at low growth rate.

In various embodiments, viscous damping in the lattice device is provided visa the interlayer bonding material. Damping using a layer of viscoelastic material constrained or sandwiched between metal or composite layers can provide 2% or more damping. Damping from viscoelastic materials require a complex stiffness model. In such embodiments, this form of damping can be modeled as a constant times velocity using NASTRAN, or other suitable modeling process.

In one or more embodiments the method 700 includes, at operation 712, testing the vibration attenuation characteristics. In various embodiments, the obtained device can be tested utilizing a modal testing process. If, the attenuation performance is within the Vibration Attenuation Requirements then, at decision point 716, the method can end as the vibration control device is sufficient to satisfy the requirements for the load. If the attenuation performance is outside of the vibration attenuation requirements then, at decision point 716 the method 700 can progress to operation 720 where the method includes tuning the vibration attenuation and resuming the testing operation at 712. In such embodiments this process can be repeated, and the design of the vibration control device iterated until a tuned vibration amplitude curve 734 is determined that is within the vibration threshold 704

For example, as described above, in at least FIGS. 3A-3B, depending on the design of the lattice structure, the various vibration control devices disclosed present a vibration isolation performance that possesses a known natural frequency that is different from other designs. In such a manner, existing payload support systems for spacecraft launch vehicles can be easily and quickly modified to include the appropriate vibration damping characteristics by replacing one or more standard components with an embodiment of the present disclosure that have been configured with latticed sidewalls for the appropriate vibration damping functionality. For example, in various embodiments the devices of FIGS. 3A-3F could be substituted for existing structural components in a rocket to adapt the rocket for vibration damping to protect a supported load. Still further, in various embodiments if a first lattice design is found to not present a vibration attenuation within the threshold, additional changes or modifications can be made to the design to shift the natural frequency and/or add further damping material to bring the attenuation curve within the threshold for the device. In such a manner various embodiments can allow for the reduction of or even the elimination of separate vibration control devices in a spacecraft, thereby reducing mass and improving payload efficiency.

In various embodiments the method 700 includes, at operation 724, installing the vibration control device. In various embodiments, due to the nature of latticed structures, embodiments can function as a drop-in replacement to an existing structure or component in a system that provides vibration attenuation/control while also preserving the same or a similar structural strength as the replaced structure/component. As such, various embodiments allow for "plug and play" use in existing/legacy systems without requiring a redesign or significant modification. For example, in various embodiments existing legacy components can simply be removed and replaced by embodiments of the disclosure that maintain similar shape, size, and structural characteristics to support loads but in contrast with the replaced component include inherent vibration attenuating/isolating characteristics as a result of a latticed structure/design.

As used herein, the terms vibration control, vibration isolation, vibration damping, vibration attenuation, and the like generally used to refer to the concept of vibration control/reduction. As such, the terms isolator, damping, attenuating, and the like are not intended to be limiting to a specific design/technology unless indicated otherwise.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A vibration control system for whole-spacecraft vibration isolation, the system comprising:
    a payload interface cone for connection between a spacecraft vibration source and a load, the payload interface cone including:
        a first support structure, a second support structure, and a sidewall extending between the first and second support structures and defining a frustoconical body of the payload interface cone, the sidewall configured to structurally support the load against the second support structure;
        the sidewall including one or more lattice portions occupying at least part of a total area of the sidewall, the lattice portions configured to attenuate a transfer of vibrations through the sidewall between the first and second support structures for reducing vibration transfer from the spacecraft vibration source and the load; and
    wherein the frustoconical body of the payload interface cone is approximately the same as a spacecraft payload interface cone without one or more lattice portions such that the payload interface cone is a drop-in replacement component; and
    wherein the system does not include independent dampening devices.

2. The system of claim 1 wherein the one or more lattice portions is a plurality of lattice portions, where each of the plurality of lattice portions are defined by one or more latitudinally extending hoops that extend about the circumference of the sidewall.

3. The system of claim 2, wherein the plurality of lattice portions includes a first lattice portion having a first lattice pattern and a second lattice portion having a second lattice pattern.

4. The system of claim 3, wherein the first and second lattice pattern is selected from a group of lattice patterns including a helical lattice, a hexagonal lattice, a P-hexagonal lattice, a Bravais lattice, a cubic Bravais lattice, a tetragonal lattice, a triclinic, monoclinic lattice, and an orthorhombic lattice.

5. The system of claim 3, wherein the first and second lattice patterns are a helical lattice, and wherein the first pattern is rotated about a central axis relative to the second pattern such that the first and second patterns are rotationally offset from one another.

6. The system of claim 3, wherein the plurality of lattice portions includes five portions and wherein each portion in the sidewall are helical lattices and are rotated about a central axis relative to one another such that the respective helical lattices connect to adjacent lattice portions at helical midspans.

7. The system of claim 2, wherein the plurality of lattice portions includes five portions and wherein a top two portions in the sidewall are helical lattices and are rotated about a central axis relative to one another such that the respective helical lattices connect at helical midspans.

8. The system of claim 2, wherein the plurality of lattice portions include three portions including a first and second portion each occupying approximately 20% of the total area of the sidewall and a third portion occupying approximately 60% of the total area of the sidewall.

9. The system of claim 1, wherein the one or more lattice portions occupy 90% or greater of the total area of the sidewall.

10. The system of claim 1, wherein the one or more lattice portions occupy 5% to 90% of the total area of the sidewall.

11. The system of claim 1, wherein the one or more lattice portions includes two or more lattice portions and where the two or more lattice portions each occupy 10% to 50% of the total area of the sidewall.

12. The system of claim 1, wherein the sidewall includes one or more non-lattice portions.

13. The system of claim 1, wherein the one or more lattice portions are adjacent in the sidewall.

14. The system of claim 1, wherein the one or more lattice portions are separated by a non-lattice portion.

15. The system of claim 1, wherein the one or more lattice portions in the sidewall are constructed at least partially from a carbon nanotube (CNT) composite material possessing vibration damping characteristics.

16. The system of claim 15, wherein the CNT lattice portions using a laminar bonding process to form the latticed structure from a plurality of bonded sheets of CNT material.

17. The system of claim 16, wherein the CNT material includes X55 acetone.

18. A vibration control system comprising:
    a vibration isolation component for structurally isolating a load from a vibration source, the vibration isolation component including:
        a first support structure, a second support structure, and a sidewall extending between the first and second support structures and defining a body of the vibration isolation component, the sidewall configured to structurally support the load against the second support structure;
        the sidewall including one or more lattice portions occupying at least part of a total area of the sidewall, the lattice portions configured to attenuate a transfer of vibrations through the sidewall between the first and second support structures for reducing vibration transfer from the vibration source and the load; and
    wherein the body of the vibration isolation component is approximately the same as a spacecraft component without one or more lattice portions such that the vibration isolation is a drop-in replacement for the spacecraft component;
    wherein the one or more lattice portions in the sidewall are constructed at least partially from a carbon nanotube (CNT) composite material possessing vibration damping characteristics; and
    wherein the system does not include independent dampening devices.

19. The vibration control device of claim 18, wherein the sidewall is cylindrical.

20. The vibration control device of claim 18, wherein the sidewall is a bulkhead.

\* \* \* \* \*